United States Patent [19]

Gotoh et al.

[11] Patent Number: 5,674,576
[45] Date of Patent: Oct. 7, 1997

[54] LIQUID CRYSTALLINE OPTICAL DEVICE OPERABLE AT A LOW DRIVE VOLTAGE

[75] Inventors: Tomohisa Gotoh; Taisaku Nakata; Hideya Murai; Etsuo Hasegawa, all of Tokyo, Japan

[73] Assignee: NEC Corporation, Tokyo, Japan

[21] Appl. No.: 526,778

[22] Filed: Sep. 12, 1995

[30] Foreign Application Priority Data

| Sep. 21, 1994 | [JP] | Japan | 6-226315 |
| Dec. 14, 1994 | [JP] | Japan | 6-309367 |
| Jan. 30, 1995 | [JP] | Japan | 7-013073 |

[51] Int. Cl.$^6$ ................ G02F 1/137
[52] U.S. Cl. ............ 428/1; 349/88; 349/89; 349/169; 524/544; 524/548; 524/549; 526/259; 526/266; 526/268; 526/270; 252/299.01; 428/209
[58] Field of Search ........ 252/299.01; 349/88, 349/89; 428/169; 524/544, 548, 549; 526/259, 266, 268, 270

[56] References Cited

U.S. PATENT DOCUMENTS

| 4,435,047 | 3/1984 | Fergason | 350/334 |
| 5,384,067 | 1/1995 | Doane et al. | 252/299.01 |
| 5,401,437 | 3/1995 | Im | 252/299.01 |
| 5,437,811 | 8/1995 | Doane et al. | 252/299.01 |

FOREIGN PATENT DOCUMENTS

| 352843 | 8/1991 | Japan . |
| 5224187 | 9/1993 | Japan . |
| 672956 | 3/1994 | Japan . |
| 6242429 | 9/1994 | Japan . |
| WO9219695 | 11/1992 | WIPO . |
| WO9323496 | 11/1993 | WIPO . |

OTHER PUBLICATIONS

M. Pfeiffer et al.; "Design of PSCT Materials for MIM Addressing"; SID 94 Digest, pp. 837–840.

Primary Examiner—Mark Nagumo
Attorney, Agent, or Firm—Whitham, Curtis, Whitham & McGinn

[57] ABSTRACT

In a liquid crystalline optical device, a light modulating layer composed of a liquid crystal and a high polymer resin is sandwiched between two substrates having electrode layers, at least one of the substrates being transparent. The polymer is a compound which is obtained by photopolymerization of a prepolymer containing a (meth)acryloyl compound having a stilbene skeleton, or a (meth)acryloyl compound including dioxane group or dioxolane group. The liquid crystalline optical device can be driven with a lower applied voltage and exhibits a reduced hysteresis.

17 Claims, 3 Drawing Sheets

LIQUID CRYSTALLINE OPTICAL DEVICE OPERABLE AT A LOW DRIVE VOLTAGE

BACKGROUND OF THE INVENTION (a) Field of the Invention

The present invention relates to a liquid crystalline optical device of a type which becomes transparent or selectively reflects visible light during absence of an applied voltage and scatters light during presence of an applied voltage. The liquid crystalline optical device according to the present invention is preferably used as a display device for displaying characters, figures, etc., or as an optical shutter and the like.

(b) Description of the Related Art

Among other display devices utilizing liquid crystals, display devices using a twisted nematic (TN) liquid crystal or super-twisted nematic (STN) liquid crystal have been developed for extensive use. On the other hand, ferroelectric liquid crystals and antiferroelectric liquid crystals have been also developed. These devices, however, provide only limited performances in brightness because of the necessity of a polarizer.

In the device disclosed by Patent Publication No. JP-B-3-52843, a liquid crystal is encapsulated and dispersed in a polymer. The disclosed device, requiring no polarizer, has an advantage that it can efficiently utilize light. This type of liquid crystalline optical device, generally called PDLC or NCAP, utilizes a phenomenon in which the refractive index of liquid crystals in capsules vary depending on the presence or absence of an electric field. By setting the refractive index of the capsule material equal to the refractive index of the liquid crystal at the time when a voltage is applied to the liquid crystal, an optical device can be obtained which becomes transparent to allow light to pass therethrough when the drive voltage is applied thereto and scatters light to become opaque when the voltage is removed.

However, since the liquid crystalline optical device as described above utilizes the difference in refractive index between the polymer and the liquid crystal, it has a problem that the light transmission (or light transmission factor) greatly changes depending on the temperature and the viewing angle.

PCT Publication No. WO 92/19695 describes a method in which a minute amount of a polymer is dispersed in a chiral nematic liquid crystal. By using this configuration, a liquid crystalline optical device can be obtained in which the liquid crystal forms a planar texture in phase during absence of an applied voltage so that the device becomes transparent, and the liquid crystal forms a focal conic texture in phase during presence of an applied voltage so that the device becomes opaque. This type of liquid crystalline optical device, generally called PSCT, does not utilize the difference in refractive index between the liquid crystal and the polymer, but utilizes a phenomenon in which light is allowed to pass through or is scattered by the liquid crystal in accordance with the phase transition of the chiral nematic liquid crystal. Therefore, the liquid crystal device has the advantage that both the temperature dependency and the viewing angle dependency of light transmission can be decreased. Further, selective reflection of visible light may be possible by adjusting the chiral pitch.

PCT Publication No. WO 92/19695 exemplifies 4,4'-bisacryloylbiphenyl as a precursor of a polymer (Prepolymer). However, the liquid crystalline optical device described in that publication is of a light transmission type and must be driven by a drive voltage as high as 14 V or above. Therefore, the device may not be driven by thin film transistors (TFTs) or the like. Further, the liquid crystalline optical device described in the publication has a large hysteresis, so that it cannot well operate in a gray scale level.

Patent publication No. JP-A-5-224187 describes an improvement on the above liquid crystalline optical device, in which 4,4'-diacryloyloxy-3,3',5,5'-tetramethylbiphenyl is exemplified as a precursor of a polymer. However, since the liquid crystalline optical device requires as high as 10 V for a driving voltage and has a large hysteresis of 0.8 V, the device is not satisfactory. In those two techniques described in Publications Nos. WO 92/19695 and JP-A-5-224187, compounds having a biphenyl skeleton are used as precursors of polymers.

It is generally known that electro-optic characteristics such as the driving voltage and the hysteresis are greatly affected by the interaction between a polymer and a chiral nematic liquid crystal. However, such an interaction cannot be predicted from their chemical structures.

SUMMARY OF THE INVENTION

In view of the foregoing, it is an object of the present invention to provide an improved liquid crystalline optical device which can be driven by a lower applied voltage and has excellent hysteresis characteristics.

According to a first aspect of the present invention, there is provided a liquid crystalline optical device in which a light modulating layer composed of a liquid crystal and a polymer is sandwiched between two substrates having electrode layers, at least one of the substrates being transparent, wherein the polymer is made of a compound which is obtained by photopolymerization of a precursor containing a (meth)acryloyl compound having a stilbene skeleton.

We carried out studies to solve the problems as described above and found that a liquid crystalline optical device which can be driven by a lower applied voltage and has excellent hysteresis characteristics can be obtained by using, as a polymer which is to be dispersed into a chiral nematic liquid crystal of a phase transition type liquid crystalline optical device, a compound which is obtained by photopolymerizing a precursor of a polymer, which precursor contains a (meth)acryloyl compound having a stilbene skeleton, as described above, or other (meth)acryloyl compounds, as will be described hereinafter. We also found that the hysteresis characteristics can be improved by copolymerizing a (meth)acryloyl compound having a stilbene skeleton with a (meth)acryloyl compound containing fluorine. The present invention has been accomplished based on those findings.

In this specification, the term "(meth)acryloyl compound" encompasses acryloyl, methacyloyl, acrylate (acryloyloxy), mechacrylate (methacryloyloxy) and their derivatives.

Examples of the (meth)acryloyl compound having a stilbene skeleton include 4-acryloyloxystilbene, 4-acryloyloxydimethylstilbene, 4-acryloyloxydiethylstilbene, 4-acryloyloxydipropylstilbene, 4-acryloyloxydibutylstilbene, 4-acryloyloxydipentylstilbene, 4-acryloyloxydihexylstilbene, 4-acryloyloxydifluorostilbene, 4-acryloyloxydichlorostilbene, 4,4'-diacryloyloxystilbene, 4,4'-diacryloyloxydimethylstilbene, 4,4'-diacryloyloxydiethylstilbene, 4,4'-diacryloyloxydipropylstilbene, 4,4'-diacryloyloxydibutylstilbene, 4,4'- diacryloyloxydipentylstilbene, 4,4'-diacryloyloxydihexylstilbene, 4,4'-diacryloyloxydifluorostilbene, 4,4'-diacryloyloxydichlorostilbene, 4-acryloylstilbene, 4-acryloyldimethylstilbene, 4-acryloyldiethylstilbene, 4-acryloyldipropylstilbene, 4-acryloyldibutylstilbene, 4-acryloyldipentylstilbene, 4-acryloyldihexylstilbene, 4-acryloyldifluorostilbene, 4-acryloyldichlorostilbene, 4,4'-diacryloylstilbene, 4,4'-diacryloyldimethylstilbene, 4,4'-diacryloyldiethylstilbene, 4,4'-diacryloyldipropylstilbene, 4,4'-diacryloyldibutylstilbene, 4,4'-diacryloyldipentylstilbene, 4,4'-diacryloyldihexylstilbene, 4,4'-diacryloyldifluorostilbene, and 4,4'-diacryloyldichlorostilbene. However, the (meth)acrylate compound as recited in the present invention is not limited to those compounds as described above.

The polymer used for the light modulating layer of the liquid crystalline optical device according to the present invention may be a polymer which is obtained by photopolymerization of a single precursor of a polymer, which precursor contains a (meth)acryloyl compound having a stilbene skeleton, or a mixture of a (meth)acryloyl compound having a stilbene skeleton and one or more other kinds of precursors of polymer.

Although ordinary precursors of polymers having a photopolymerizable group such as an acryloyl group and a vinyl group may be used as the other kinds of photopolymerizable precursors, (meth)acryloyl compounds containing fluorine are particularly effective. A plurality of photopolymerizable groups may exist in each molecule of the precursor.

Examples of the (meth)acryloyl compound which contains fluorine and which can be copolymerized with the (meth)acryloyl compound having a stilbene skeleton include: monoacrylates such as 2,2,2-trifluoroethyl acrylate, 2,2,3,3,3-pentafluoropropyl acrylate, 2,2,3,3-tetrafluoropropyl acrylate and 2,2,3,4,4,4-hexafluorobutyl acrylate; monomethacrylates such as 2,2,2-trifluoroethyl methacrylate, 2,2,3,3-tetrafluoropropyl methacrylate and 2,2,3,4,4,4-hexafluorobutyl methacrylate; diacryates such as 2,2,3,3,4,4-hexafluoropentanediol-1,5-diacrylate; and dimethacryates such as 2,2,3,3,4,4-hexafluoropentanediol-1,5-methacrylate.

Examples of precursors having a photopolymerizable group, other than the (meth)acryloyl compound containing fluorine, which can be copolymerized with the (meth) acryloyl compound having a stilbene skeleton according to the present invention includes: acrylates having a single functional group such as 2-ethylhexyl acrylate, butylethyl acrylate, butoxyethyl acrylate, 2-cyanoethyl acrylate, benzyl acrylate, cyclohexyl acrylate, 2-hydroxypropyl acrylate, 2-ethoxyethyl acrylate, N,N-diethylaminoethyl acrylate, N,N-dimethylaminoethyl acrylate, dicyclopentanyl acrylate, dicyclopentenyl acrylate, glycidyl acrylate, tetahydrofurfuryl acrylate, isobornyl acrylate, isodecyl acrylate, lauryl acrylate, morpholine acrylate, phenoxyethyl acrylate and phenoxydiethyleneglycol acrylate; methacrylates having a single functional group such as 2-ethylhexyl methacrylate, butylethyl methacrylate, butoxyethyl methacrylate, 2-cyanoethyl methacrylate, benzyl methacrylate, cyclohexyl methacrylate, 2-hydroxypropyl methacrylate, 2-ethoxyethyl methacrylate, N,N-diethylaminoethyl methacrylate, N,N-dimethylaminoethyl methacrylate, dicyclopentanyl methacrylate, dicyclopentenyl methacrylate, glycidyl methacrylate, tetrahydrofurfuryl methacrylate, isobornyl methacrylate, isodecyl methacrylate, lauryl methacrylate, morpholine methacrylate, phenoxyethyl methacrylate and phenoxydiethyleneglycol methacrylate; acrylates having a plurality of functional groups such as diethyleneglycol diacrylate, 1,4-butanediol diacrylate, 1,3-butyleneglycol diacrylate, dicyclopentanyl diacrylate, glycerol diacrylate, 1,6-hexanediol diacrylate, neopentylglycol diacrylate, tetraethyleneglycol diacrylate, trimethylolpropane triacrylate, pentaerythritol tetraacrylate, pentaerythritol triacrylate, ditrimethylolpropane tetraacrylate, dipentaerythritol hexaacrylate, dipentaerythritol monohydroxypentaacrylate and urethane acrylate oligomers; methacrylates having a plurality of functional groups such as diethyleneglycol dimethacrylate, 1,4-butanediol dimethacrylate, 1,3-butyleneglycol dimethacrylate, dicyclopentanyl dimethacrylate, glycerol dimethacrylate, 1,6-hexanediol dimethacrylate, neopentylglycol dimethacrylate, tetraethyleneglycol dimethacrylate, trimethylolpropane trimethacrylate, pentaerythritol tetramethacrylate, pentaerythritol trimethacrylate, ditrimethylolpropane tetramethacrylate, dipentaerythritol hexamethacrylate, dipentaerythritol monohydroxypentamethacrylate and urethane methacrylate oligomers; styrene; aminostyrene; vinyl acetate; etc.

Preferably, the polymer is contained in the chiral nematic liquid crystal in an amount of from 0.5 wt. % to 8.0 wt. %. When the amount is less than 0.5 wt. %, the scattering performance decreases so that the contrast degrades too low. On the other hand, when the amount is greater than 8.0 wt. %, the transparency during absence of an applied voltage decreases and a high applied voltage is required to effectively drive the liquid crystalline optical device.

When the polymer is a copolymer of a (meth)acryloyl compound having a stilbene skeleton and one or more other kinds of precursors of polymer, the (meth)acryloyl compound having a stilbene skeleton is preferably contained in an amount of 30 wt. % or higher. Especially, when the (meth)acryloyl compound having a stilbene skeleton is copolymerized with a (meth)acryloyl compound containing fluorine, the (meth)acryloyl compound having a stilbene skeleton is preferably contained in an amount of 60 wt. % or higher. When the content of the (meth)acryloyl compound having a stilbene skeleton is too low, the requisite driving voltage will be too high and the hysteresis will be too large.

A chiral nematic liquid crystal which is obtained by mixing a chiral material into a nematic liquid crystal may be used in the liquid crystalline optical device according to the present invention. However, an ordinary cholesteric liquid crystal having characteristics similar to those of the chiral nematic liquid crystal may be also used.

Although the nematic liquid crystal may be of a cyanic, fluorinated or chlorinated liquid crystal, it preferably has a high charge holding ratio, a high anisotropy of refractive index (or birefringence $\Delta n$), and a high anisotropy of dielectric constant ($\Delta \epsilon$). Especially, a chlorinated liquid crystal is effective. Also, no limitation is imposed on the chiral material. It preferably is compatible with liquid crystals.

The ratio of the nematic liquid crystal to the chiral material is determined based on a desired chiral pitch. When the chiral nematic liquid crystal is of a light transmission/scattering type, the chiral pitch is preferably not less than 1.0 μm and not greater than 5.0 μm. When the chiral nematic liquid crystal is of a selective reflection type, the chiral pitch is preferably not less than 0.25 μm and not greater than 1.0 μm.

Glass, plastic, metal, etc., can be used as the material of the substrates used in the present invention.

The substrates are disposed such that the electrode layer of each substrate is located on the side facing the light modulating layer.

The electrode layers may be made of ITO or the like. However, when the substrates are electrically conductive, the substrates themselves may be formed as electrode layers. The electrode layers are disposed such that they closely contact the light modulating layer.

Although the substrate having the electrode layer may be ones which have not been treated to align liquid crystals, the substrates are preferably ones which have been so treated. In this case, the two substrates both may provide homogeneous alignment, or they may have a hybrid structure in which one of the substrates provides homogeneous alignment while the other provides homeotropic alignment. For the treatment for alignment, an ordinary alignment film such as a polyimide, which is generally used in TN liquid crystals, STN liquid crystals, etc., can be used. Preferably, the alignment film is subjected to rubbing treatment.

Rod-like or spherical spacers made of glass or a polymer, which are generally used in conventional liquid crystalline optical devices, are used to provide a gap between the substrates. The gap is preferably not smaller than 3 μm and not larger than 30 μm.

The liquid crystalline optical device of the first aspect of the present invention can be manufactured by injecting a mixture of a chiral nematic liquid crystal and a precursors of polymer between substrates which have a predetermined gap therebetween, and irradiating light thereon. The injection of the mixture may be performed under reduced pressure or under normal pressure. The substrates may be heated if needed.

The liquid crystalline optical device of the first aspect of the present invention can be applied not only to a device of a light transmission type in which a light modulating layer is sandwiched between two transparent substrates each having an electrode layer, but also to a structure in which one of the substrates is opaque. Examples of such a structure include a structure in which a light modulating layer is sandwiched between a transparent substrate having an electrode layer and a light reflecting plate having another electrode layer, and a structure in which a light modulating layer is sandwiched between a transparent substrate having an electrode layer and a light absorbing plate having another electrode layer.

The light reflecting plate may be made of an inorganic material or an organic material, provided that the selected material can reflect light. The reflectance and reflecting wavelengths may arbitrarily be selected depending on the characteristics of the device to be obtained. The light reflecting plate may be made entirely of a light reflecting material, or it may be made by coating another material such as glass with a light reflecting material. In the latter case, the light reflecting material may be located on the side facing the light modulating layer or on the opposite side. When the light reflecting material coated on the substrate is not located on the side facing the light modulating layer, the substrate is not required to be optically clear.

The light absorbing plate may be made of an inorganic material or an organic material, provided that the selected material can absorb light. The absorption performance and absorption wavelengths may arbitrarily be changed depending on the characteristics of the device to be obtained. The light absorbing plate may be made entirely of a light absorbing material, or it may be made by coating another material such as glass with a light absorbing material. In the latter case, the light absorbing material may be located on the side facing the light modulating layer or on the opposite side. When the light absorbing material coating the substrate is not located on the side facing the light modulating layer, the substrate is not required to be optically clear.

When the light reflecting material or the light absorbing material is electrically conductive, it can be used as electrode layers.

The liquid crystalline optical device according to the present invention can be applied to architectural materials such as windows, partitions and display devices for displaying characters and figures.

According to a second aspect of the present invention, there is provided a liquid crystalline optical device in which a light modulating layer composed of a chiral nematic or cholesteric liquid crystal and a polymer is sandwiched between two substrates having electrode layers, at least one of the substrates being transparent, wherein the polymer is a compound which is obtained by polymerizing a precursor containing a (meth)acryloyl compound having one of dioxane group and a dioxolane group.

The (meth)acryloyl compound may be represented by the following formula (I):

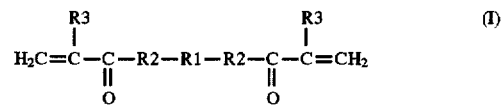

wherein R1 is selected from a group consisting of functional groups represented by:

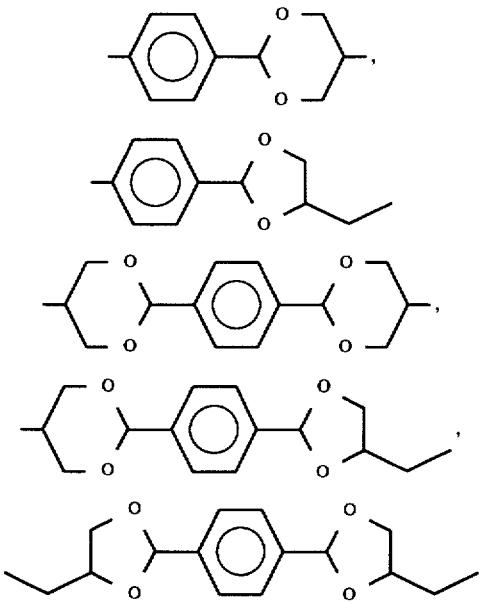

R2 is —O— or a direct bond without an atom, and
R3 is —H or —CH3.

Patent Publication No. JP-A-58(1983)-109481 and JP-A-61(1986)-73792 disclose compounds similar to the compound as used in the present invention and liquid crystalline display devices using the same. These compounds, however, are used as a chiral compound for liquid crystals or as a component of liquid crystals, and they have molecular structures different from that of the (meth)acryloyl compound, as recited in the present invention, which has a dioxane group or a dioxolane group and is a precursor. Also, they are used in a manner different from the manner of use of the compound in the present invention.

The polymer used for the light modulating layer of the liquid crystalline optical device according to the second aspect of the present invention can be used not only as a polymer which is dispersed in a chiral nematic liquid crystal of the phase transition type liquid crystalline optical device as described before, but also as a polymer which is used in conventional liquid crystalline optical devices such as PDLC and NCAP.

The polymer used for the light modulating layer of the liquid crystalline optical device according to the second aspect of the present invention may be a polymer which is obtained by photopolymerizing a single kind of (meth)acryloyl compound represented by formula (I), or a copolymer of two or more kinds of (meth)acryloyl compounds represented by formula (I), or a copolymer of a single kind of (meth)acryloyl compound represented by formula (I) and one or more other kinds of precursors represented by other chemical formulae. Ordinary precursors of high polymer resin having a polymerizable group such as an acryloyl group and a vinyl group may be used as the other kinds of polymerizable precursors. A plurality of polymerizable groups may exist in each molecule of the precursor.

Examples of precursors of polymer having a photopolymerizable group which can be copolymerized with the (meth)acryloyl compound expressed by formula (I) includes: acrylates having a single functional group such as 2-ethylhexyl acrylate, butylethyl acrylate, butoxyethyl acrylate, 2-cyanoethyl acrylate, benzyl acrylate, cyclohexyl acrylate, 2-hydroxypropyl acrylate, 2-ethoxyethyl acrylate, N,N-diethylaminoethyl acrylate, N,N-dimethylaminoethyl acrylate, dicyclopentanyl acrylate, dicyclopentenyl acrylate, glycidyl acrylate, tetrahydrofurfuryl acrylate, isobornyl acrylate, isodecyl acrylate, lauryl acrylate, morpholine acrylate, phenoxyethyl acrylate, phenoxydiethyleneglycol acrylate, tetrafluorofurfuryl acrylate, 2,2,2-trifluoroethyl acrylate, 2,2,3,3,3-pentafluoropropyl acrylate, 2-(perfluorobutyl) ethyl acrylate and 2-(perfluorodecyl)ethyl acrylate; methacrylates having a single functional group such as 2-ethylhexyl methacrylate, butylethyl methacrylate, butoxyethyl methacrylate, 2-cyanoethyl methacrylate, benzyl methacrylate, cyclohexyl methacrylate, 2-hydroxypropyl methacrylate, 2-ethoxyethyl methacrylate, N,N-diethylaminoethyl methacrylate, N,N-dimethylaminoethyl methacrylate, dicyclopentanyl methacrylate, dicyclopentenyl methacrylate, glycidyl methacrylate, tetrahydrofurfuryl methacrylate, isobornyl methacrylate, isodecyl methacrylate, lauryl methacrylate, morpholine methacrylate, phenoxyethyl methacrylate, phenoxydiethyleneglycol methacrylate, 2,2,2-trifluoroethyl methacrylate, 2,2,3,3,3-pentaefluoropropyl methacrylate, 2-(perfluorobutyl)etyl methacrylate, 2-(perfluorohexyl)etyl metahcrylate and 2-(perfluorodecyl)etyl methacrylate; acrylates having a plurality of functional groups such as diethyleneglycol diacrylate, 1,4-butanediol diacrylate, 1,3-butyleneglycol diacrylate, dicyclopentanyl diacrylate, glycerol diacrylate, 1,6-hexanediol diacrylate, neopentylglycol diacrylate, tetraethyleneglycol diacrylate, trimethylolpropane triacrylate, pentaerythritol tetraacrylate, pentaerythritol triacrylate, ditrimethylolpropane tetraacrylate, dipentaerythritol hexaacrylate, dipentaerythritol monohydroxypentaacrylate, urethane acrylate oligomers, 4,4'-diacryloyloxystilbene, 4,4'-diacryloyloxydiethylstilbene, 4,4'-diacryloyloxydipropylstilbene, 4,4'-diacryloyloxydibutylstilbene, 4,4'-diacryloyloxyfluorostilbene, 4,4'-diacryloyloxydichlorostilbene, 2,2,3,3,4,4-hexafluoro-1,5-pentanedioldiacrylate, 2,2,3,3,4,4,5,5-octafluoro-1,6-hexandioldiacrylate; methacrylates having a plurality of functional groups such as diethyleneglycol dimethacrylate, 1,4-butanediol dimethacrylate, 1,3-butyleneglycol dimethacrylate, dicyclopentanyl dimethacrylate, glycerol dimethacrylate, 1,6-hexanediol dimethacrylate, neopentylglycol dimethacrylate, tetraethyleneglycol dimethacrylate, trimethylolpropane trimethacrylate, pentaerythritol tetramethacrylate, pentaerythritol trimethacrylate, ditrimethylolpropane tetramethacrylate, dipentaerythritol hexamethacrylate, dipentaerythritol monohydroxypentamethacrylate, urethane methacrylate oligomers, 4,4'-dimethacryloyloxystilbene, 4,4'-dimethacryloyloxydiethylstilbene, 4,4'-dimethacryloyloxydipropylstilbene, 4,4'-dimethacryloyloxydibutylstilbene, 4,4-dimethacryloyloxyfluorostilbene, 4,4'-dimethacryloyloxydichlorostilbene, 2,2,3,3,4,4-hexafluoro-1,5-pentanedioldimethacrylate and 2,2,3,3,4,4,5,5-octafluoro-1,6-hexandioldimethacrylate; styrene; aminostyrene; vinyl acetate; etc., but are not limited thereto.

Examples of the method for polymerizing the precursor include photopolymerization and heat polymerization.

Glass, plastic, metal, etc., can be used as the material of the substrates used in the second aspect of the present invention. Also, a colored optical device can be obtained by using a substrate having a color filter, or by dispersing a pigment or a colorant into the substrates.

According to a third aspect of the present invention, there is provided a liquid crystalline optical device in which a light modulating layer composed of a liquid crystal and a polymer is sandwiched between two substrates having electrode layers, at least one of the substrates being transparent, wherein the polymer is a compound which is obtained by photopolymerization of a precursor of a polymer containing a (meth)acryloyl compound represented by the following formula (II):

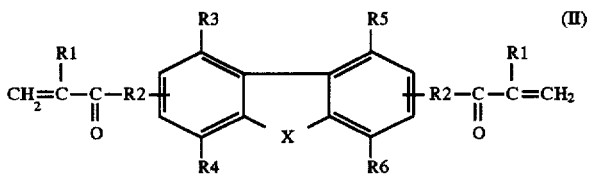

wherein R1 is —H or —CH3, R2 is —O— or a direct bond without an atom, R3, R4, R5 and R6 are independently —H, —OH, a halogen atom, an amino group which may be substituted, an alkyl group which may be substituted, an alkoxy group which may be substituted, or an aryl group which may be substituted, X is —CR$^7$R$^8$— (R$^7$ and R$^8$ are independently —H, —OH, a halogen atom, an amino group which may be substituted, an alkyl group which may be substituted, an alkoxy group which may be substituted, an alkoxy group which may be substituted or an aryl group which may be substituted), —O—, —NH—, or —NR$^9$— (R$^9$ is an alkyl group which may be substituted or an aryl group which may be substituted).

The term "(meth)acryloyl compound" encompasses acrylate (acryloyloxy), methacylate (methacryloyloxy), acryloyl compound, methacyloyl compound, and their derivatives.

The polymer used for the light modulating layer of the liquid crystalline optical device according to the third aspect of the present invention may be a polymer which is obtained by photopolymerization of a single precursor of a polymer, which precursor contains a (meth)acryloyl compound, or a copolymer of a precursor of a polymer containing a (meth) acryloyl compound and one or more other kinds of precursors of polymers.

Ordinary precursors of polymer having a photopolymerizable group such as an acryloyl group and a vinyl group may be used as the other kinds of photopolymerizable precursors of polymers. A plurality of photopolymerizable groups may exist in each molecule of the precursor.

Examples of precursors of polymer having a photopolymerizable group which can be copolymerized with the (meth)acryloyl compound expressed by formula (II) includes: acrylates having a single functional group such as 2-ethylhexyl acrylate, butylethyl acrylate, butoxyethyl acrylate, 2-cyanoethyl acrylate, benzyl acrylate, cyclohexyl acrylate, 2-hydroxypropyl acrylate, 2-ethoxyethyl acrylate, N,N-diethylaminoethyl acrylate, N,N-dimethylaminoethyl acrylate, dicyclopentanyl acrylate, dicyclopentenyl acrylate, glycidyl acrylate, tetahydrofurfuryl acrylate, isobornyl acrylate, isodecyl acrylate, lauryl acrylate, morpholine acrylate, phenoxyethyl acrylate, phenoxydiethyleneglycol acrylate, 2,2,2-trifluoroethyl acrylate, 2,2,3,3,3-pentafluoropropyl acrylate, 2,2,3,3-tetrafluoropropyl acrylate and 2,2,3,4,4,4-hexafluorobutyl acrylate; methacrylates having a single functional group such as 2-ethylhexyl methacrylate, butylethyl methacrylate, butoxyethyl methacrylate, 2-cyanoethyl methacrylate, benzyl methacrylate, cyclohexyl methacrylate, 2-hydroxypropyl methacrylate, 2-ethoxyethyl methacrylate, N,N-diethylaminoethyl methacrylate, N,N-dimethylaminoethyl methacrylate, dicyclopentanyl methacrylate, dicyclopentenyl methacrylate, glycidyl methacrylate, tetrahydrofurfuryl methacrylate, isobornyl methacrylate, isodecyl methacrylate, lauryl methacrylate, morpholine methacrylate, phenoxyethyl methacrylate, phenoxydiethyleneglycol methacrylate, 2,2,2-trifluoroethyl methacrylate, 2,2,3,3-tetrafluoropropyl methacrylate and 2,2,3,4,4,4-hexafluorobutyl methacrylate; acrylates having a plurality of functional groups such as diethyleneglycol diacrylate, 1,4-butanediol diacrylate, 1,3-butyleneglycol diacrylate, dicyclopentanyl diacrylate, glycerol diacrylate, 1,6-hexanediol diacrylate, neopentylglycol diacrylate, tetraethyleneglycol diacrylate, trimethylolpropane triacrylate, pentaerythritol tetraacrylate, pentaerythritol triacrylate, ditrimethylolpropane tetraacrylate, dipentaerythritol hexaacrylate, dipentaerythritol monohydroxypentaacrylate, 4,4'-diacryloyloxystilbene, 4,4'-diacryloyloxydimethylstilbene, 4,4'-diacryloyloxydiethylstilbene, 4,4'-diacryloyloxydipropylstilbene, 4,4'-diacryloyloxydibutylstilbene, 4,4'-diacryloyloxydipentylstilbene, 4,4'-diacryloyloxydihexylstilbene, 4,4'-diacryloyloxydifluorostilbene, 2,2,3,3,4,4-hexafluoropentanediol and 1,5-diacrylateurethane acrylate oligomers; methacrylates having a plurality of functional groups such as diethyleneglycol dimethacrylate, 1,4-butanediol dimethacrylate, 1,3-butyleneglycol dimethacrylate, dicyclopentanyl dimethacrylate, glycerol dimethacrylate, 1,6-hexanediol dimethacrylate, neopentylglycol dimethacrylate, tetraethyleneglycol dimethacrylate, trimethylolpropane trimethacrylate, pentaerythritol tetramethacrylate, pentaerythritol trimethacrylate, ditrimethylolpropane tetramethacrylate, dipentaerythritol hexamethacrylate, dipentaerythritol monohydroxypentamethacrylate, 2,2,3,4,4-hexafluoropentanediol, 1,5-methacrylate and urethane methacrylate oligomers; styrene; aminostyrene; vinyl acetate; etc., but are not limited thereto.

In addition to visible rays and ultraviolet rays, electron beams can be used for photopolymerization of the precursor of polymer. When the photopolymerization is performed using visible rays or ultraviolet rays in the present invention, a photopolymerization initiator is preferably added to accelerate the reaction. Examples of such a photopolymerization initiator includes: acetophenones such as 2,2-diethoxyacetophenone, 2-hydroxy-2-methyl-1-phenyl-1-one, 1-(4-isoproplyphenyl)-2-hydroxy-2-methylpropane-1-one, 1-(4-dodecylphenyl)-2-hydroxy-2-methylpropane-1-one, 2-methyl-1-[4-(methylchio)phenyl]-2-morpholinopropane-1; benzoins such as benzoin methylether, benzoin ethylether, benzoin isopropylether and benzyl dimethylketal; benzophenones such as benzophenone, benzoyl benzoate, 4-phenylbenzophenone and 3,3-dimethyl-4-methoxybenzophenone; thioxanthones such as thioxanthone, 2-chlorothioxanthone and 2-methylthioxanthone; diazoninum salts; sulfonium salts; iodoninum salts; and selenium salts.

Although the initiator may be solid or liquid, the initiator is preferably one which can be dissolved in liquid crystals or is compatible with liquid crystals from the viewpoint of uniformity of resulting devices. The amount of the initiator is preferably 30 wt. % or less with respect to the precursor. Also, a photopolymerization initiation promoting agent such as methyldiethanolamine and 4-dimethylaminobenzoate may be added if needed.

The above and other objects, features and advantages of the present invention will be more apparent from the following description considered with the accompanying drawings.

DESCRIPTION OF PREFERRED EMBODIMENTS

The present invention will now be described in detail by way of examples. However, the present invention is not limited thereto.

The terms "driving voltage", "hysteresis width", "contrast ratio", "ON- and OFF-response times" and "charge holding ratio" as used in the following examples are defined in this text as follows:

Driving voltage: a voltage at which the transmission reaches $0.1 \times (Tmax-Tmin)+Tmin$, where Tmax and Tmin are the maximum and the minimum transmission in the transmission-voltage curve, respectively.

Hysteresis width: the difference, at the transmission of $(Tmax+Tmin)/2$, between the increasing and the decreasing voltage curve.

Contrast ratio: the value calcualted by Tmax/Tmin.

ON-response time: a period of time needed to drive a cell from Tmax to $0.1 \times (Tmax-Tmin)+Tmin$ in light transmission after the application of a voltage specified.

OFF-response time: a period of time needed to drive a cell from Tmin to $0.9 \times (Tmax-Tmin)+Tmin$ in light transmission after the removal of the applied voltage as specified above.

Charge holding ratio: When a pulse signal having an amplitude of 5 V and a pulse width of 60 microseconds (μs) is applied to the device, the charge holding ratio is expressed by the following equation:

$$\text{Charge holding ratio} = (V_h/5) \times 100 \ (\%)$$

wherein $V_h$ is the voltage held by the device at the time instant 16.7 ms elapsed since the end of the pulse signal.

EXAMPLES OF THE FIRST ASPECT

Figure 1:
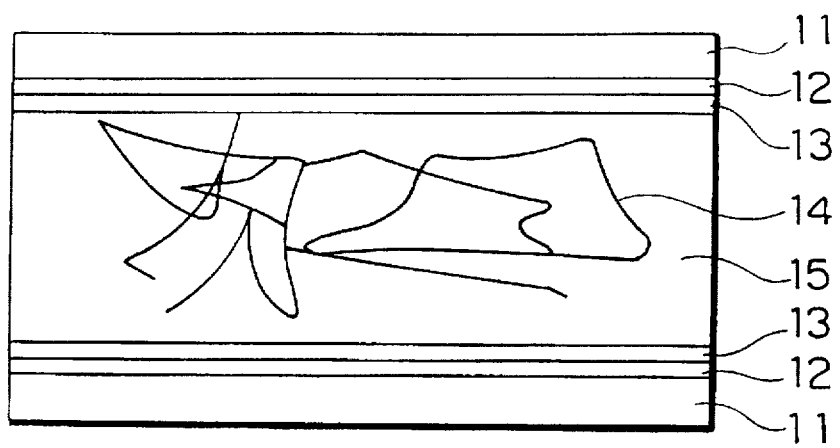
FIG. 1 is a schematic sectional view showing the structure of a liquid crystalline optical device according to the first and the third aspects of the present invention.

A liquid crystalline optical device of the first aspect of the present invention is schematically shown in FIG. 1, in which 11, 12, 13, 14 and 15 denote a glass substrate, an electrode, an alignment layer (orientation layer), a polymer and a chiral nematic liquid crystal, respectively. Examples 1 through 5 were fabricated according to the first aspect of the present invention and evaluated, as detailed below.

Example 1

A mixed solution of 95.6 wt. % of a chlorinated nematic liquid crystal TL215 (provided by Merck & Co.), 2.4 wt. % of a chiral material S811 (provided by Merck & Co.), 1.9 wt. % of diethylstilbestrol diacrylate (precursor of a polymer) and 0.10 wt. % of benzoin methylether (a polymerization initiator), exhibiting a chiral pitch of the chiral nematic liquid crystal at 3.8 μm, was injected into a cell which was composed of two transparent glass substrates each having a laminate of an electrode layer and an alignment layer treated for homogeneous alignment and which had a gap of 9 μm. 0.1 mW/cm² of ultraviolet rays having a wavelength of 365 nm were irradiated onto the liquid crystal cell for 150 minutes while maintaining the cell at 20° C. to set or cure the precursor of a polymer.

The electro-optic characteristics of the liquid crystalline optical device thus manufactured were measured by applying a rectangular wave of 100 Hz, by using a He-Ne laser as a light source and by using a photo diode as a detector. The f-value of the optical system was 15. The characteristics of Example 1 were measured at 25° C., as follows:

| | |
|---|---|
| Driving voltage | 6.4 V |
| Light transmission (Applied voltage: 0 V) | 83% |
| Light transmission (Applied voltage: 8 V) | 1.2% |
| Contrast ratio | 69 |
| Hysteresis width | 0.23 V |
| ON-response time (Applied voltage: 8 V) | 25 ms |
| OFF-response time | 12 ms |
| Charge holding ratio | 95% |

Figure 2:
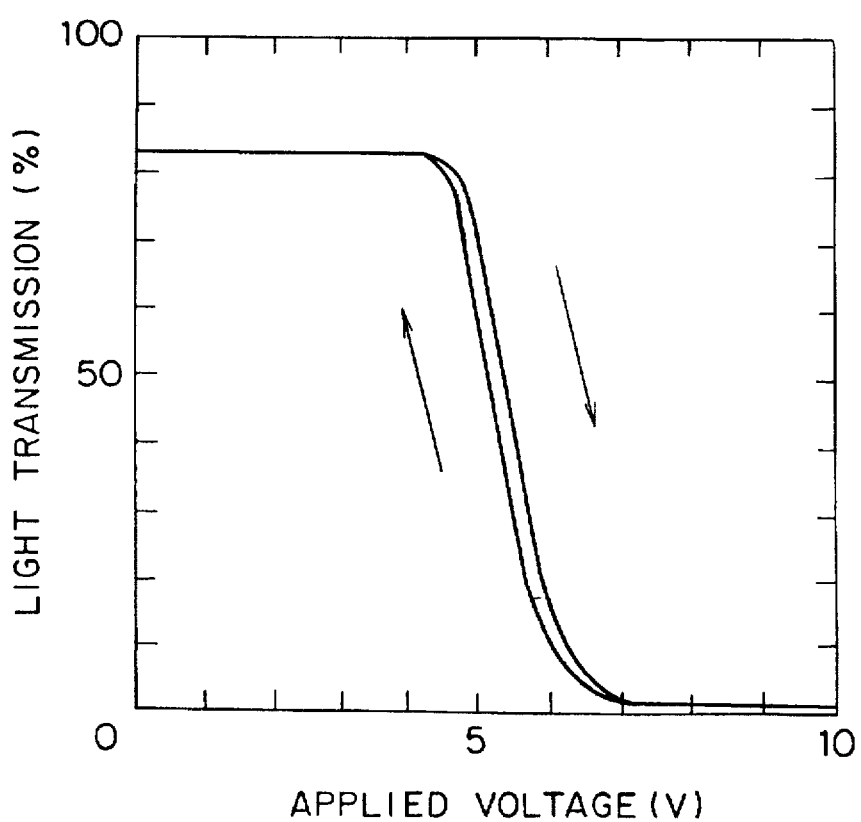
FIG. 2 is a graph showing applied voltage dependency of the light transmission of a liquid crystalline optical device of a first example (embodiment) of the present invention.

The light transmission of the device according to the present embodiment exhibited an excellent small hysteresis, as shown in FIG. 2.

Example 2

A mixed solution of 95.8 wt. % of a chlorinated nematic liquid crystal TL215, 2.5 wt. % of a chiral material S811, 1.4 wt. % of diethylstilbestrol diacrylate, 0.5 wt. % of 2,2,3,3, 4,4-hexafluoropentane-1,5-diol diacrylate and 0.10 wt. % of 2,2-diethoxyacetophenone, exhibiting a chiral pitch of the chiral nematic liquid crystal at 3.6 μm, was injected into a cell which was composed of two transparent glass substrates each having a laminate of an electrode layer and an alignment layer treated for homogeneous alignment and which had a gap of 9 μm.

The irradiation of ultraviolet rays and the evaluation of electro-optic characteristics were performed under conditions similar to those in Example 1.

| | |
|---|---|
| Driving voltage: | 6.4 V |
| Light transmission (Applied voltage: 0 V) | 81% |
| Light transmission (Applied voltage: 7 V) | 1.1% |
| Contrast ratio | 73 |
| Hysteresis width | 0.19 V |
| ON-response time (Applied voltage: 8 V) | 22 ms |
| OFF-response time | 11 ms |
| Charge holding ratio | 93% |

Comparative Example 1

A liquid crystalline optical device was manufactured and evaluated in a manner similar to that in Example 1 except that, instead of diethylstilbestrol diacrylate, 4,4-bisacryloylbiphenyl (1.9 wt. %) was used as a precursor of the polymer.

| | |
|---|---|
| Driving voltage: | 16.2 V |
| Light transmission (Applied voltage: 0 V) | 80% |
| Light transmission (Applied voltage: 20 V) | 2.5% |
| Contrast ratio | 32 |
| Hysteresis width | 4.5 V |
| ON-response time (Applied voltage: 20 V) | 12 ms |
| OFF-response time | 17 ms |
| Charge holding ratio | 92% |

Comparative Example 2

A liquid crystalline optical device was manufactured and evaluated in a manner similar to that in Example 1 except that, instead of diethylstilbestrol diacrylate, 4,4-diacryloyloxybiphenyl (1.9 wt. %) was used as a precursor of the polymer.

| | |
|---|---|
| Driving voltage: | 14.5 V |
| Light transmission (Applied voltage: 0 V) | 81% |
| Light transmission (Applied voltage: 17 V) | 3.0% |
| Contrast ratio | 27 |
| Hysteresis width | 3.7 V |
| ON-response time (Applied voltage: 17 V) | 10 ms |
| OFF-response time | 12 ms |
| Charge holding ratio | 91% |

Example 3

A liquid crystalline optical device was manufactured and evaluated in a manner similar to that in Example 1 except that, instead of diethylstilbestrol diacrylate, 4,4-diacryloyloxydifluorostilbene (1.9 wt. %) was used as a precursor of the polymer.

| | |
|---|---|
| Driving voltage: | 6.7 V |
| Light transmission (Applied voltage: 0 V) | 82% |
| Light transmission (Applied voltage: 7 V) | 1.3% |
| Contrast ratio | 63 |
| Hysteresis width | 0.20 V |
| ON-response time (Applied voltage: 8 V) | 29 ms |
| OFF-response time | 13 ms |
| Charge holding ratio | 92% |

Example 4

A liquid crystalline optical device was manufactured and evaluated in the same manner as in Example 2 except that instead of diethylstilbestrol diacrylate, 4,4-diacryloyloxydifluorostilbene (1.9 wt. %) was used as a precursor of the polymer.

| | |
|---|---|
| Driving voltage: | 6.5 V |
| Light transmission (Applied voltage: 0 V) | 80% |
| Light transmission (Applied voltage: 7 V) | 1.5% |
| Contrast ratio | 53 |
| Hysteresis width | 0.17 V |
| ON-response time (Applied voltage: 8 V) | 30 ms |
| OFF-response time | 12 ms |
| Charge holding ratio | 91% |

The liquid crystalline optical devices according to the first aspect of the present invention which utilizes phase transition characteristic can be driven by a lower applied voltage, and therefore, they can be driven even by TFTs. Also, the reduced hysteresis allow them to well display in a gray scale level.

Example 5

A liquid crystalline optical device was manufactured and evaluated in a manner similar to that in Example 1 except that the amount of the liquid crystal was 70 wt. %, and the amount of chiral material 28 wt. %, in the present example. The device thus manufactured selectively reflected visible light when the applied voltage is 0 V. When an applied pulse signal having an amplitude of 50 V and a frequency of 100 Hz was applied thereto, the liquid crystal exhibited a focal conic state (light scattering state) and was kept in this state to store the data therein. When a pulse signal having an amplitude of 100 V was applied to the device, it returned back to the original state which selectively reflect visible light. The charge holding ratio was estimated at 90%.

EXAMPLES OF THE SECOND ASPECT

A liquid crystalline optical device of the second aspect of the present invention is similar to the optical device of the first aspect shown in FIG. 1. Examples 6 and 7 were fabricated according to the second aspect of the present invention and evaluated, as detailed below.

Example 6

A mixed solution of 95.0 wt. % of a chlorinated nematic liquid crystal TL215, 3.0 wt. % of a chiral material S811, 1.95 wt. % of 2-(paraacryloyloxyphenyl)-5-acryloyloxy-1,3-dioxane and 0.05 wt. % of benzoin methylether, exhibiting a chiral pitch of the chiral nematic liquid crystal at 3.3 μm, was injected into a cell which was composed of two transparent glass substrates each having a laminate of an electrode layer and an alignment layer treated for homogeneous alignment and which had a gap of 10 μm. 0.1 mW/cm² of ultraviolet rays having a wavelength of 365 nm were irradiated onto the liquid crystal cell for 180 minutes while maintaining the cell at 20° C. to cure the acryloyl compound.

The electro-optical characteristics of the liquid crystalline optical device thus manufactured were measured by applying a rectangular wave of 100 Hz, by using a He-Ne laser as a light source and by using a photo diode as a detector. The f-value of the optical system was 15. The characteristics of Example 6 were measured at 25° C. as follows:

| | |
|---|---|
| Driving voltage | 6.7 V |
| Light transmission (Applied voltage: 0 V) | 84% |
| Light transmission (Applied voltage: 8 V) | 1.0% |
| Contrast ratio | 84 |
| Hysteresis width | 0.24 V |
| ON-response time (Applied voltage: 8 V) | 24 ms |
| OFF-response time | 18 ms |
| Charge holding ratio | 93% |

Figure 3:
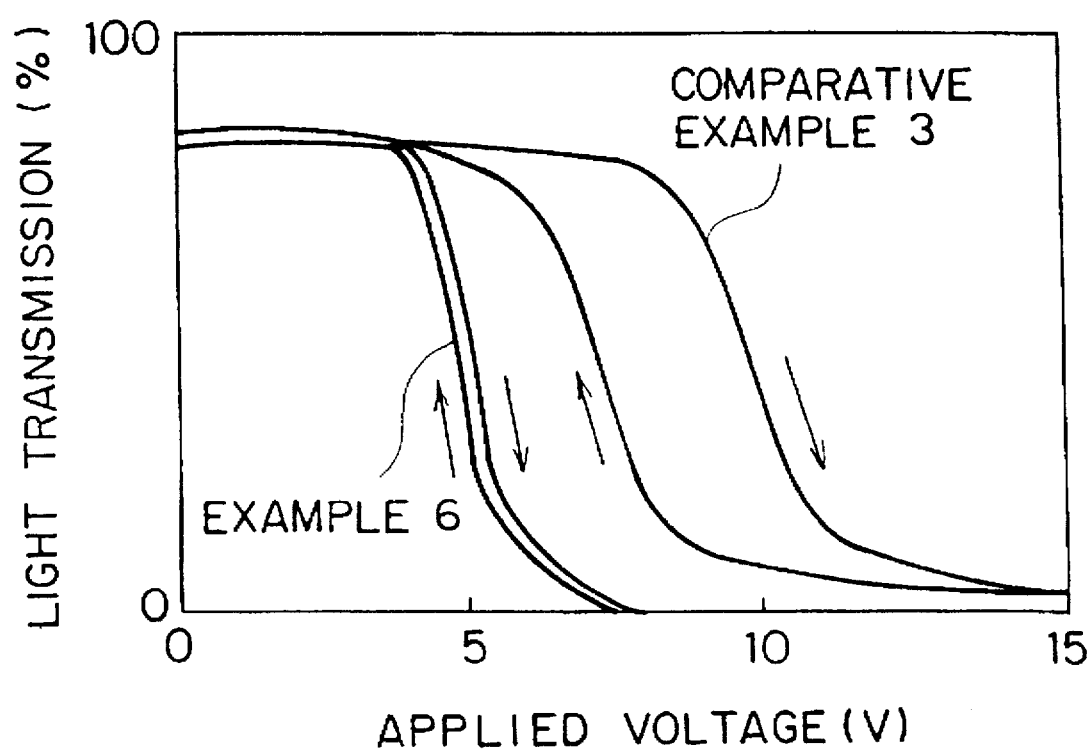
FIG. 3 is a graph showing applied voltage dependency of the light transmission of a liquid crystalline optical device of a sixth example of the present invention.

The light transmission of Example 6 exhibited an excellent small hysteresis, as shown in FIG. 3.

Example 7

A mixture of 96.0 wt. % of a cyano type liquid crystal RDP-71120-1 (provided by RODIC Corp.), 2.0 wt. % of a chiral material S811, 1.95 wt. % of 1,4-bis(5-acryloyloxy-1,3- dioxane)-2-yl)benzene and 0.05 wt. % of 2,2-diethoxyacetophenone, exhibiting a chiral pitch of the chiral nematic liquid crystal at 4.5 μm, was injected into a cell which was composed of two transparent glass substrates each having a laminate of an electrode layer and an alignment layer treated for homogeneous alignment and which had a gap of 10 μm. The irradiation of ultraviolet rays and the evaluation of electro-optic characteristics were performed under conditions similar to those in Example 6.

| | |
|---|---|
| Driving voltage | 6.9 V |
| Light transmission (Applied voltage: 0 V) | 80% |
| Light transmission (Applied voltage: 9 V) | 1.1% |
| Contrast ratio | 73 |
| Hysteresis width | 0.20 V |
| ON-response time (Applied voltage: 9 V) | 27 ms |
| OFF-response time | 17 ms |

Comparative Example 3

A liquid crystalline optical device was manufactured and evaluated in a manner similar to that in Example 6 except that 4,4-bisacryloylbiphenyl (1.95 wt. %) was used as a precursor of the polymer.

| | |
|---|---|
| Driving voltage | 13.1 V |
| Light transmission (Applied voltage: 0 V) | 82% |
| Light transmission (Applied voltage: 15 V) | 2.6% |
| Contrast ratio | 32 |
| Hysteresis width | 3.2 V |
| ON-response time (Applied voltage: 15 V) | 15 ms |
| OFF-response time | 19 ms |
| Charge holding ratio | 92% |

Comparative Example 4

A liquid crystalline optical device was manufactured and evaluated in a manner similar to that in Example 7 except that 4,4-bisacryloylbiphenyl (1.95 wt. %) was used as a precursor of the polymer.

| | |
|---|---|
| Driving voltage | 12.4 V |
| Light transmission (Applied voltage: 0 V) | 81% |
| Light transmission (Applied voltage: 15 V) | 2.0% |
| Contrast ratio | 41 |
| Hysteresis width | 3.0 V |
| ON-response time (Applied voltage: 15 V) | 19 ms |
| OFF-response time | 22 ms |

The liquid crystalline optical devices according to the second aspect of the present invention which utilizes phase transition can provide increased contrast so that sharp images can be obtained. Also, they can be driven by a lower applied voltage, and therefore, they can be driven even by TFTs. Moreover, the reduced hysteresis allow them to be operated in a gray scale level.

EXAMPLES OF THE THIRD ASPECT

A liquid crystalline optical device of the third aspect of the present invention is similar to the optical device of the first aspect shown in FIG. 1. Examples 8 through 12 were fabricated according to the third aspect of the present invention and evaluated, as detailed below.

Example 8

A mixed solution of 95.6 wt. % of a chlorinated type nematic liquid crystal TL215, 2.4 wt. % of a chiral material S811, 1.9 wt. % of 2,7-diacryloyloxyfluorene (precursor of a polymer) and 0.10 wt. % of benzoin methylether (a polymerization initiator), exhibiting a chiral pitch of the chiral nematic liquid crystal at 3.8 µm, was injected into a cell which was composed of two transparent glass substrates each having an electrode layer and an alignment layer treated for homogeneous alignment and which had a gap of 9 µm. 0.1 mW/cm$^2$ of ultraviolet rays having a wavelength of 365 nm were irradiated onto the liquid crystal cell for 150 minutes while maintaining the cell at 20° C. to cure the precursor of a polymer.

The electro-optical characteristics of the liquid crystalline optical device thus manufactured were measured by applying a rectangular wave of 100 Hz, by using a He-Ne laser as a light source, and by using a photo diode as a detector. The f-value of the optical system was 15. The characteristics of Example 8 were measured at 25° C. as follows:

| | |
|---|---|
| Driving voltage | 7.6 V |
| Light transmission (Applied voltage: 0 V) | 80% |
| Light transmission (Applied voltage: 8 V) | 1.5% |
| Contrast ratio | 80 |
| Hysteresis width | 0.21 V |
| ON-response time (Applied voltage: 8 V) | 15 ms |
| OFF-response time | 12 ms |
| Charge holding ratio | 93% |

Figure 4:
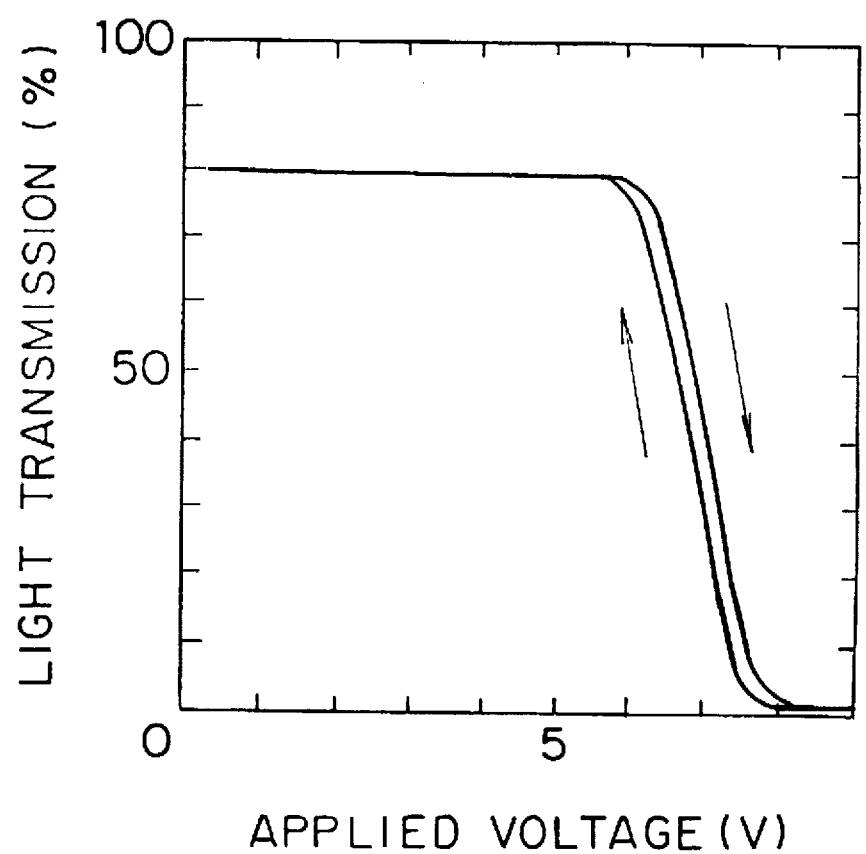
FIG. 4 is a graph showing applied voltage dependency of the light transmission of a liquid crystalline optical device of an eighth example of the present invention.

The light transmission of the device according to the present example exhibited an excellent small hysteresis, as shown in FIG. 4.

Example 9

A mixture of 95.6 wt. % of a chlorinated nematic liquid crystal TL215, 2.5 wt. % of a chiral material S811, 1.8 wt. % of 2,7-diacryloylfluorene and 0.10 wt. % of 2,2-diethoxyacetophenone, exhibiting a chiral pitch of the chiral nematic liquid crystal at 3.6 µm, was injected into a cell which was composed of two transparent glass substrates each having an electrode layer and an alignment layer treated for homogeneous alignment and which had a gap of 9 µm.

The irradiation of ultraviolet rays and the evaluation of electro-optic characteristics were performed under conditions similar to those in Example 8.

| | |
|---|---|
| Driving voltage | 7.6 V |
| Light transmission (Applied voltage: 0 V) | 84% |
| Light transmission (Applied voltage: 7 V) | 1.2% |
| Contrast ratio | 70 |
| Hysteresis width | 0.13 V |
| ON-response time (Applied voltage: 8 V) | 18 ms |
| OFF-response time | 11 ms |
| Charge holding ratio | 90% |

Comparative Example 5

A liquid crystalline optical device was manufactured and evaluated in a manner similar to that in Example 8 except that, instead of 2,7-diacryloyloxyfluorene, 4,4-bisacryloyloxybiphenyl (1.9 wt. %) was used as a precursor of the polymer.

| | |
|---|---|
| Driving voltage | 14.2 V |
| Light transmission (Applied voltage: 0 V) | 80% |
| Light transmission (Applied voltage: 20 V) | 1.5% |
| Contrast ratio | 32 |
| Hysteresis width | 4.5 V |
| ON-response time (Applied voltage: 20 V) | 12 ms |
| OFF-response time | 17 ms |
| Charge holding ratio | 92% |

Comparative Example 6

A liquid crystalline optical device was manufactured and evaluated in a manner similar to that in Example 8 except that, instead of 2,7-diacryloylfluorene, 4,4-diacryloyloxybiphenyl (1.9 wt. %) was used as a precursor of the polymer.

| | |
|---|---|
| Driving voltage | 14.5 V |
| Light transmission (Applied voltage: 0 V) | 81% |
| Light transmission (Applied voltage: 17 V) | 3.0% |
| Contrast ratio | 27 |
| Hysteresis width | 3.7 V |
| ON-response time (Applied voltage: 17 V) | 10 ms |
| OFF-response time | 12 ms |
| Charge holding ratio | 91% |

Example 10

A liquid crystalline optical device was manufactured and evaluated in a manner similar to that in Example 8 except that, instead of 2,7-diacryloyloxyfluorene, 2,7-diacryloyloxydibenzofuran (1.9 wt. %) was used as a precursor of the polymer.

| | |
|---|---|
| Driving voltage | 7.7 V |
| Light transmission (Applied voltage: 0 V) | 84% |
| Light transmission (Applied voltage: 7 V) | 1.5% |
| Contrast ratio | 56 |
| Hysteresis width | 0.20 V |
| ON-response time (Applied voltage: 8 V) | 25 ms |
| OFF-response time | 15 ms |
| Charge holding ratio | 92% |

Example 11

A liquid crystalline optical device was manufactured and evaluated in a manner similar to that in Example 9 except that, instead of 2,7-diacryloylfluorene, 2,7-dimethacryloylfluorene (1.9 wt. %) was used as a precursor of the polymer.

| | |
|---|---|
| Driving voltage | 7.6 V |
| Light transmission (Applied voltage: 0 V) | 80% |
| Light transmission (Applied voltage: 7 V) | 1.0% |
| Contrast ratio | 80 |
| Hysteresis width | 0.21 V |
| ON-response time (Applied voltage: 8 V) | 15 ms |
| OFF-response time | 13 ms |
| Charge holding ratio | 91% |

The liquid crystalline optical devices according to the third aspect of the present invention which utilizes phase transition can be driven with a lower voltage, and therefore, they can be driven even by TFTs. Also, the reduced hysteresis allow them to be operated in a gray scale level.

Example 12

A liquid crystalline optical device was manufactured and evaluated in a manner similar to that in Example 8 except that the amount of the liquid crystal was 70 wt. %, and the amount of chiral material was 28 wt. % in Example 12. The device thus manufactured selectively reflected visible light when no applied voltage was applied. When a pulse signal having an amplitude of 50 V and frequency of 100 Hz was applied, the liquid crystal became a focal conic state (light scattering state) and were kept in this state. When a voltage of 100 V was applied to the device, it returned to the original state to selectively reflect visible light. The charge holding ratio was 90%.

Since above embodiments are described only for examples, the present invention is not limited to such embodiments and it will be obvious for those skilled in the art that various modifications or alterations can be easily made based on the above embodiments within the scope of the present invention.

What is claimed is:

1. A liquid crystalline optical device comprising a pair of substrates each having an electrode layer, at least one of said substrates being transparent, a light modulating layer sandwiched between said pair of substrates and composed of a liquid crystal and a polymer, said liquid crystal being one of a chiral nematic liquid crystal and a cholesteric liquid crystal, said polymer is a compound obtained by polymerizing a precursor containing at least one first compound selected from a group consisting of acryloyl and methacryloyl, said first compound having a stilbene skeleton.

2. A liquid crystalline optical device as defined in claim 1 wherein said light modulating layer forms a planar texture in phase during absence of an applied voltage and forms a focal conic texture in phase during presence of an applied voltage.

3. A liquid crystalline optical device as defined in claim 1 wherein said precursor further contains at least one second compound selected from a group consisting of acryloyl, methacryloyl and said second compound having no stilbene skeleton.

4. A liquid crystalline optical device as defined in claim 3 wherein said precursor contains said first compound in an amount not lower than 30 wt %.

5. A liquid crystalline optical device as defined in claim 3 wherein said second compound includes fluorine.

6. A liquid crystalline optical device as defined in claim 5 wherein said precursor contains said first compound in an amount not lower than 60 wt %.

7. A liquid crystalline optical device as defined in claim 1 wherein said light modulating layer includes said polymer in an amount between 0.5 wt % and 8.0 wt %.

8. A liquid crystalline optical device comprising a pair of substrates each having an electrode layer, at least one of said substrates being transparent, a light modulating layer sandwiched between said pair of substrates and composed of a liquid crystal and a polymer, said liquid crystal being one of a chiral nematic liquid crystal and a cholesteric liquid crystal, said polymer is a compound obtained by polymerizing a precursor containing at least one first compound selected from a group consisting of acryloyl and methacryloyl, said first compound having at least one of dioxane and dioxolane groups.

9. A liquid crystalline optical device as defined in claim 8 wherein said light modulating layer forms a planar texture in phase during absence of an applied voltage and forms a focal conic texture in phase during presence of an applied voltage.

10. A liquid crystalline optical device as defined in claim 8 wherein said light modulating layer includes said polymer in an amount between 0.5 wt % and 8.0 wt %.

11. A liquid crystalline optical device as defined in claim 8 wherein said first compound is expressed by the following formula:

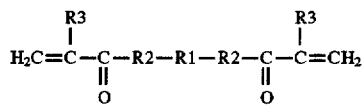

wherein R1 is selected from functional groups represented by:

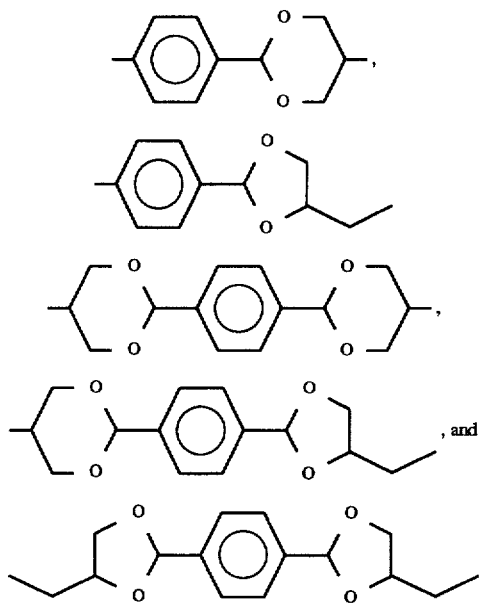

R2 is —O or a direct bond without an atom, and R3 is selected from a group consisting of —H and —CH$_3$.

12. A liquid crystalline optical device comprising a pair of substrates each having an electrode layer, at least one of said substrates being transparent, a light modulating layer sandwiched between said pair of substrates and composed of a liquid crystal and a polymer, said liquid crystal being one of a chiral nematic liquid crystal and a cholesteric liquid crystal, said polymer is a compound obtained by polymerizing a precursor containing at least one first compound selected from a group consisting of acrylate and methacrylate, said first compound being represented by the following formula:

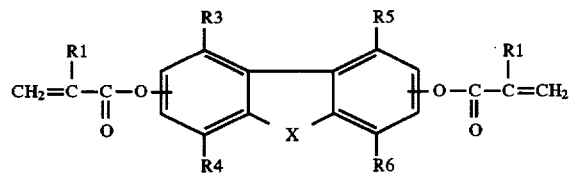

wherein R1 is selected from a group consisting of radicals —H and —CH3, wherein R3, R4, R5 and R6 are independently selected from a group consisting of —H, —OH, halogen, amino, alkyl, alkoxy and aryl, and wherein X is selected from a group consisting of —$CR^7R^8$—, —O—, —NH— and $NR^9$, $R^7$ and $R^8$ being independently selected from a group consisting of —H, —OH, a halogen atom, amino, alkyl, alkoxy and aryl, $R^9$ being selected from a group consisting of alkyl and aryl.

13. A liquid crystalline optical device as defined in claim 12 wherein said light modulating layer forms a planar texture in phase during absence of an applied voltage and forms a focal conic texture in phase during presence of an applied voltage.

14. A liquid crystalline optical device as defined in claim 12 wherein said light modulating layer includes said polymer in an amount between 0.5 wt % and 8.0 wt %.

15. A liquid crystalline optical device comprising a pair of substrates each having an electrode layer, at least one of said substrates being transparent, a light modulating layer sandwiched between said pair of substrates and composed of a liquid crystal and a polymer, said liquid crystal being one of a chiral nematic liquid crystal and a cholesteric liquid crystal, said polymer is a compound obtained by polymerizing a precursor containing at least one first compound selected from a group consisting of acryloyl and methacryloyl, said first compound being represented by the following formula:

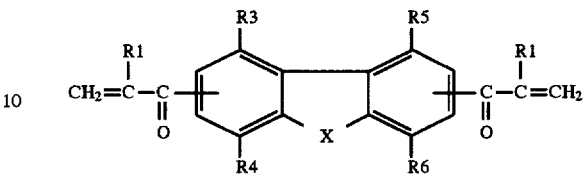

wherein R1 is selected from a group consisting of —H and —CH$_3$, wherein R3, R4, R5 and R6 are independently selected from a group consisting of —H, —OH, halogen, amino, alkyl, alkoxy and aryl, and wherein X is selected from a group consisting of —$CR^7R^8$—, —O—, —NH— and $NR^9$, $R^7$ and $R^8$ being independently selected from a group consisting of —H, —OH, a halogen atom, amino, alkyl, alkoxy and aryl, $R^9$ being selected from a group consisting of alkyl and aryl.

16. A liquid crystalline optical device as defined in claim 15 wherein said light modulating layer forms a planar texture in phase during absence of an applied voltage and forms a focal conic texture in phase during presence of an applied voltage.

17. A liquid crystalline optical device as defined in claim 15 wherein said light modulating layer includes said polymer in an amount between 0.5 wt % and 8.0 wt %.

* * * * *